United States Patent
Nguyen et al.

(10) Patent No.: US 9,210,717 B2
(45) Date of Patent: Dec. 8, 2015

(54) METHODS AND APPARATUS FOR LTE MAC LOGICAL CHANNEL PRIORITIZATION BASED ON CONTROL DATA

(71) Applicant: QUALCOMM Incorporated, San Diego, CA (US)

(72) Inventors: Bao Vinh Nguyen, Corona, CA (US); Shailesh Maheshwari, San Diego, CA (US); Ashwini Raina, Santa Clara, CA (US); Gang Andy Xiao, San Diego, CA (US); Prasanna Venkata Santosh Kumar Tallapragada, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 145 days.

(21) Appl. No.: 14/065,297

(22) Filed: Oct. 28, 2013

(65) Prior Publication Data

US 2014/0133410 A1 May 15, 2014

Related U.S. Application Data

(60) Provisional application No. 61/726,866, filed on Nov. 15, 2012.

(51) Int. Cl.
*H04Q 7/00* (2006.01)
*H04W 72/08* (2009.01)
*H04W 72/02* (2009.01)

(52) U.S. Cl.
CPC ............ *H04W 72/087* (2013.01); *H04W 72/02* (2013.01)

(58) Field of Classification Search
None
See application file for complete search history.

(56) References Cited

U.S. PATENT DOCUMENTS

| | | | |
|---|---|---|---|
| 8,488,540 B2 * | 7/2013 | Yi et al. | 370/329 |
| 2009/0154430 A1 * | 6/2009 | Guo | 370/336 |
| 2010/0077100 A1 | 3/2010 | Hsu et al. | |
| 2011/0038333 A1 | 2/2011 | Yi et al. | |
| 2011/0044192 A1 * | 2/2011 | Wang et al. | 370/252 |
| 2012/0057547 A1 | 3/2012 | Lohr et al. | |
| 2012/0076103 A1 | 3/2012 | Dai et al. | |
| 2012/0275381 A1 | 11/2012 | Kim et al. | |
| 2013/0028223 A1 | 1/2013 | Kim et al. | |
| 2013/0051334 A1 * | 2/2013 | Sammour et al. | 370/329 |

OTHER PUBLICATIONS

Fujitsu: "Network-controlled autonomous denial", 3GPP Draft; R2-121797, 3rd Generation Partnership Project (3GPP), Mobile Competence Centre ; 650, Route Des Lucioles ; F-06921 Sophia-Antipolis Cedex ; France, vol. Ran WG2, no. Jeju, South Korea; 20120326-20120330, Mar. 19, 2012, pp. 1-3, XP050606057, [retrieved on Mar. 19, 2012].
International Search Report and Written Opinion—PCT/US2013/067467—ISA/EPO—Feb. 21, 2014.

* cited by examiner

*Primary Examiner* — Duc C Ho
(74) *Attorney, Agent, or Firm* — Patterson & Sheridan, LLP

(57) ABSTRACT

Aspects of the present disclosure provide methods, systems, devices and/or apparatuses for logical channel prioritization by a user equipment (UE) within a Long Term Evolution (LTE) wireless communications network. The UE may have multiple logical channels each associated with one or more applications or services of the UE. The UE may identify whether a quality of service (QoS) obligation to allocate at least a portion of uplink resources to a logical channel for a time period is present, and may also identify whether the logical channel has control data to be transmitted from the UE. If a QoS obligation and/or control data are present for the logical channel, the UE may allocate at least a portion of the uplink resources to the logical channel.

30 Claims, 11 Drawing Sheets

|  | Logical Channel 1 (Priority 1; PBR=32kbps) | Logical Channel 2 (Priority 2; PBR=16kbps) | Logical Channel 3 (Priority 3; PBR=8kbps) |
|---|---|---|---|
| TTI 0 $B_j$ | 0 | 0 | 0 |
| TTI 1 $B_j$ | + 32 | + 16 | + 8 |
| TTI 2 $B_j$ | - 16 | 0 | + 8 |
| TTI 3 $B_j$ | - 8 | - 8 | 0 |

FIG. 4

METHODS AND APPARATUS FOR LTE MAC LOGICAL CHANNEL PRIORITIZATION BASED ON CONTROL DATA

CLAIM OF PRIORITY UNDER 35 U.S.C. §119

This application claims benefit of U.S. Provisional Patent Application Ser. No. 61/726,866, filed Nov. 15, 2012, which is herein incorporated by reference in its entirety.

BACKGROUND

1. Field

Aspects of the present disclosure relate generally to one or more portions of communication systems, and more particularly, to methods and apparatus for logical channel prioritization based on logical channel quality of service (QoS) obligations and/or control data for a user equipment (UE) within a Long Term Evolution (LTE) wireless communications network.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced provide a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method for logical channel prioritization by a user equipment (UE) within a Long Term Evolution (LTE) wireless communications network is provided. The method generally includes receiving an allocation of uplink resources at the UE for a time period, identifying whether the UE has a quality of service (QoS) obligation to allocate at least a portion of the uplink resources to a first logical channel for the time period, identifying, for the time period, whether the first logical channel has control data to be transmitted from the UE, and allocating at least a portion of the uplink resources to the first logical channel based on at least one of (a) whether the UE has a QoS obligation to allocate at least a portion of the uplink resources to the first logical channel for the time period, or (b) whether the first logical channel has control data to be transmitted from the UE.

In an aspect of the disclosure, an apparatus for wireless communications by a UE within a LTE wireless communications network is provided. The apparatus generally includes at least one processor configured to receive an allocation of uplink resources at the UE for a time period, identify whether the UE has a QoS obligation to allocate at least a portion of the uplink resources to a first logical channel for the time period, identify, for the time period, whether the first logical channel has control data to be transmitted from the UE, and allocate at least a portion of the uplink resources to the first logical channel based on at least one of (a) whether the UE has a QoS obligation to allocate at least a portion of the uplink resources to the first logical channel for the time period, or (b) whether the first logical channel has control data to be transmitted from the UE. The apparatus also generally includes a memory coupled with the at least one processor.

In an aspect of the disclosure, an apparatus for logical channel prioritization by a UE within a LTE wireless communications network is provided. The apparatus generally includes means for receiving an allocation of uplink resources at the UE for a time period, means for identifying whether the UE has a QoS obligation to allocate at least a portion of the uplink resources to a first logical channel for the time period, means for identifying, for the time period, whether the first logical channel has control data to be transmitted from the UE, and means for allocating at least a portion of the uplink resources to the first logical channel based on at least one of (a) whether the UE has a QoS obligation to allocate at least a portion of the uplink resources to the first logical channel for the time period, or (b) whether the first logical channel has control data to be transmitted from the UE.

In an aspect of the disclosure, a computer program product for wireless communications by a UE within a LTE wireless communications network is provided. The computer program product generally includes a computer-readable medium having code for receiving an allocation of uplink resources at the UE for a time period, identifying whether the UE has a QoS obligation to allocate at least a portion of the uplink resources to a first logical channel for the time period, identifying, for the time period, whether the first logical channel has control data to be transmitted from the UE, and allocating at least a portion of the uplink resources to the first logical channel based on at least one of (a) whether the UE has a QoS obligation to allocate at least a portion of the uplink resources to the first logical channel for the time period, or (b) whether the first logical channel has control data to be transmitted from the UE.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 4 illustrates an example of token bucket values for different logical channels at successive time intervals, in accordance with certain aspects of the present disclosure.

DETAILED DESCRIPTION

Figure 1:
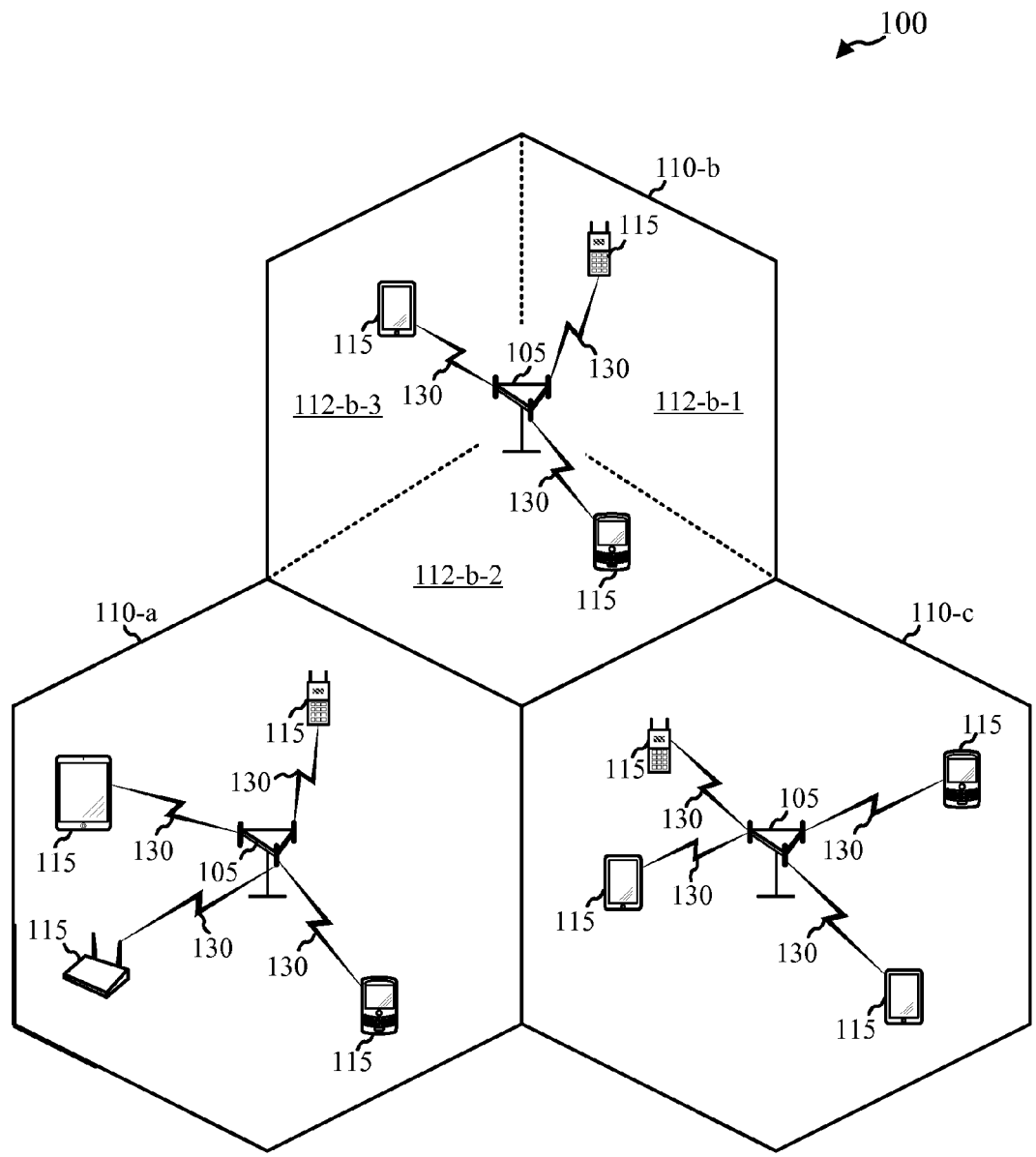
FIG. 1 illustrates an example wireless communication system, in accordance with certain aspects of the present disclosure.
Figure 1:
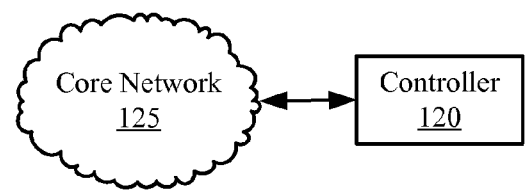

Methods, systems, devices and/or apparatuses are described for logical channel prioritization by a user equipment (UE) within a Long Term Evolution (LTE) wireless communications network. The UE may have multiple logical channels each associated with one or more applications or services of the UE. In some wireless networks, a UE may not allocate any uplink resources to a particular logical channel in the absence of a Quality of Service (QoS) obligation to allocate resources to the logical channel. In some cases, however, a UE may have control data to be transmitted for the logical channel, and a delay in transmission of such control data may result in undesired behaviors in the UE.

According to certain aspects, the present disclosure provides a UE that identifies whether a QoS obligation to allocate at least a portion of uplink resources to a logical channel for a time period is present, and also identifies whether the logical channel has control data to be transmitted from the UE. If a QoS obligation and/or control data are present for the logical channel, the UE may allocate at least a portion of the uplink resources to the logical channel. The UE may identify the QoS obligation by the value of a token bucket associated with a particular logical channel and also determine if the logical channel has control data that is to be transmitted to a base station (BS) using uplink resources. According to an aspect, if the token bucket indicates no QoS obligation and there is control data for the logical channel, uplink resources may be allocated to the logical channel according to an established logical channel priority. According to another aspect, if the token bucket indicates no QoS obligation and there is no control data for the logical channel, uplink resources may not be allocated to the logical channel.

Although particular aspects are described herein, many variations and permutations of these aspects fall within the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Although some benefits and advantages of the preferred aspects are mentioned, the scope of the disclosure is not intended to be limited to particular benefits, uses or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

FIG. 1 illustrates an example of a wireless communication system 100 in which aspects of the present disclosure may be employed. The system 100 may include base stations (BSs) 105 (or cells), communication devices 115, a base station controller (BSC) 120 and a core network 125. In an aspect, although not shown, the controller 120 may be integrated into the core network 125. The system 100 may support operation on multiple carriers (e.g., waveform signals of different frequencies). Multi-carrier transmitters may transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may be a multi-carrier LTE network capable of efficiently allocating network resources.

The BSs 105 may wirelessly communicate with the devices 115 via a base station antenna (not shown). The BSs 105 may communicate with the devices 115 under the control of the BSC 120 via multiple carriers. Each of the BSs 105 sites may provide communication coverage for a respective geographic area. In some embodiments, BSs 105 may be referred to as a base transceiver station, a radio base station, an access point (AP), a radio transceiver, a basic service set (BSS), an extended service set (ESS), a NodeB, enhanced NodeB (eNB), Home NodeB, a Home eNodeB, or some other suitable terminology. The coverage area for each BS 105 (e.g., as illustrated in FIG. 1) is identified as 110-a, 110-b, or 110-c. The coverage area for a BS may be divided into sectors making up only a portion of the coverage area (e.g., sectors 112-b-1, 112-b-2, 112-b-3, etc.). The system 100 may include BSs 105 of different types (e.g., macro, pico, and/or femto BSs). A macro BS may provide communication coverage for a relatively large geographic area (e.g., 35 km in radius), a pico BS may provide coverage for a relatively small geographic area (e.g., 12 km in radius), and a femto BS may provide communication coverage for a relatively smaller geographic area (e.g., 50 m in radius). There may be overlapping coverage areas for different technologies.

The devices 115 may be dispersed throughout the coverage areas 110. Each device 115 may be stationary or mobile. In one configuration, the devices 115 may be able to communicate with different types of BSs such as, but not limited to, macro BSs, pico BSs, and femto BSs, via link 130. The link 130 may be a communication link that facilitates transmission from a BS 105 to a device 115 and may include downlink communications from BSs 105 to devices 115 and/or uplink communications from devices 115 to BSs 105. Alternatively, a downlink may be referred to as a forward link or a forward channel, and an uplink may be referred to as a reverse link or a reverse channel. The devices 115 may be capable of providing multiple different services to a user such as, for example, voice communications, text messages, email access, network access to remote networks such as the Internet, and file transfers to/from remote computers, to name a few. Each such service may have an associated Quality of Service (QoS) target that the devices 115 try to maintain in order to have a favorable user experience. Different services, QoSs, and logical channels within the devices 115 that support the different services will be described in more detail below. The devices 115 may be referred to as mobile stations, mobile devices, access terminals (ATs), user equipments (UEs), subscriber stations (SSs), subscriber units or some other suitable terminology. The devices 115 may include cellular phones and wireless communications devices, but may also include personal digital assistants (PDAs), other handheld devices, netbooks, notebook computers, tablet computers, etc.

In one example, the network controller 120 may be coupled to a set of BSs and provide coordination and control for these BSs 105. The controller 120 may communicate with the BSs 105 via a backhaul (e.g., core network 125). The BSs 105 may also communicate with one another directly or indirectly and/or via wireless or wireline backhaul.

Figure 2:
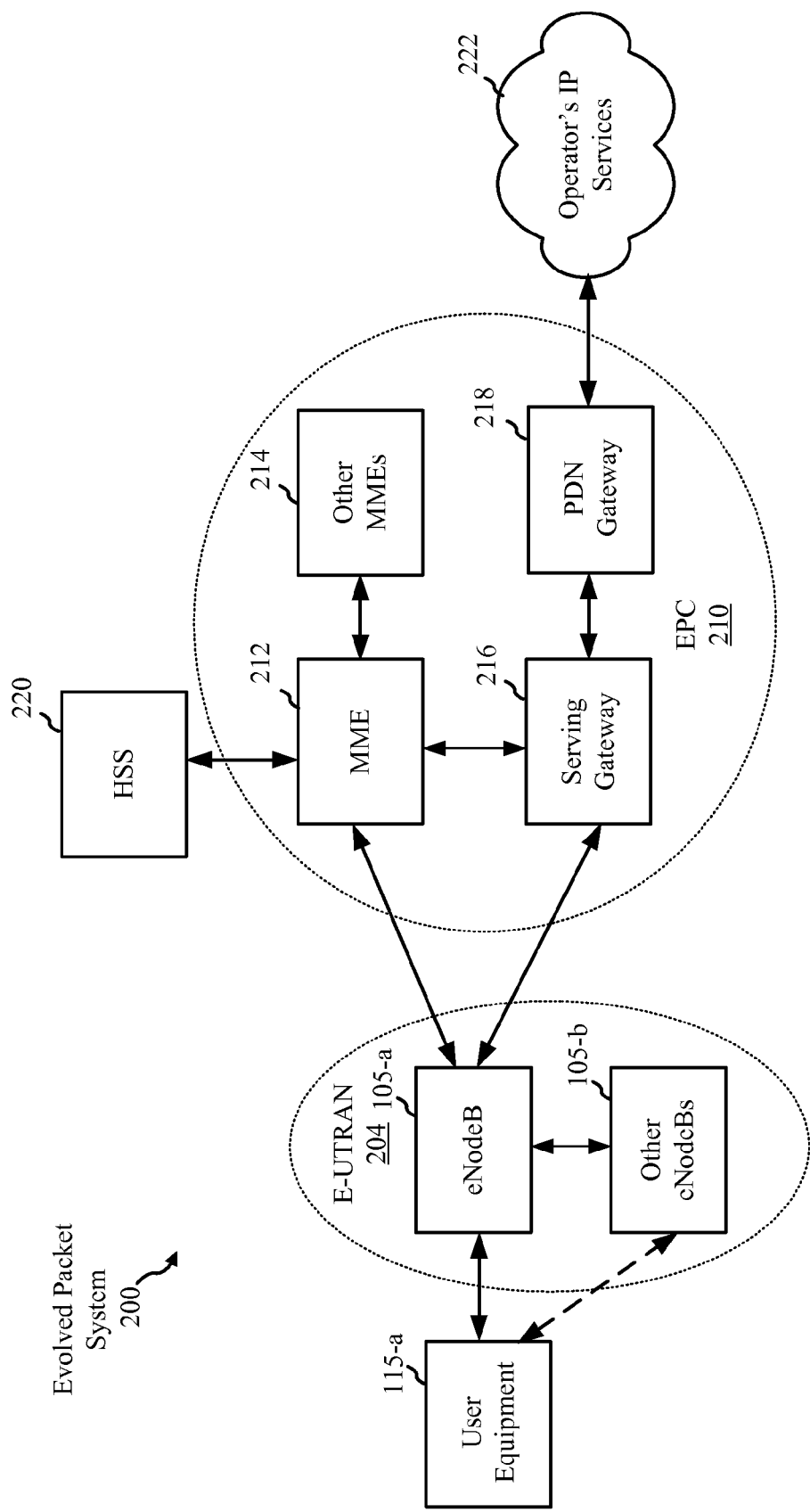
FIG. 2 illustrates an example of a network architecture in a wireless communications system, in accordance with certain aspects of the present disclosure.

FIG. 2 illustrates an example LTE/LTE-Advanced (LTE-A) network architecture 200, in accordance with various aspects of the present disclosure. The LTE/LTE-A network architecture 200 may be referred to as an Evolved Packet System (EPS) 200. The EPS 200 may include one or more UEs 115-a, an Evolved UMTS Terrestrial Radio Access Network (E-UTRAN) 204, an Evolved Packet Core (EPC) 210, a Home Subscriber Server (HSS) 220, and an Operator's IP Services 222. The EPS 200 may interconnect with other access networks, but for simplicity those entities/interfaces are not shown. As shown, the EPS 200 provides packet-switched services, however, as those skilled in the art will readily appreciate, the various concepts presented throughout this disclosure may be extended to networks providing circuit-switched services.

The E-UTRAN 204 may include an eNB 105-a and other eNBs 105-b. The eNB 105-a may provide user and control plane protocol terminations toward the UE 115-a. The eNB 105-a may be connected to the other eNBs 105-b via an X2 interface (e.g., backhaul). The eNB 105-a may provide an access point to the EPC 210 for the UE 115-a. Examples of UEs 115-a may include, but are not limited to, cellular phones, smart phones, session initiation protocol (SIP) phones, laptops, personal digital assistants (PDAs), satellite radios, global positioning systems, multimedia devices, video devices, digital audio players (e.g., MP3 player), cameras, game consoles, or other similar functioning devices. As mentioned above, UE 115-a may be capable of providing multiple different services to a user, and each such service may have an associated QoS target. Different services, QoS targets, and logical channels within the UE 115-a that support the different services will be described in more detail below.

The eNB 105-a may be connected by an S1 interface to the EPC 210. The EPC 210 may include a Mobility Management Entity (MME) 212, other MMEs 214, a Serving Gateway 216, and a Packet Data Network (PDN) Gateway 218. The MME 212 may be the control node that processes the signaling between the UE 115-a and the EPC 210. Generally, the MME 212 may provide bearer and connection management. All user IP packets may be transferred through the Serving Gateway 216, which itself may be connected to the PDN Gateway 218. The PDN Gateway 218 may provide UE IP address allocation as well as other functions. The PDN Gateway 218 may be connected to the Operator's IP Services 222. The Operator's IP Services 222 may include the Internet, the Intranet, an IP Multimedia Subsystem (IMS), and a Packet-Switched (PS) Streaming Service (PSS).

Figure 3:
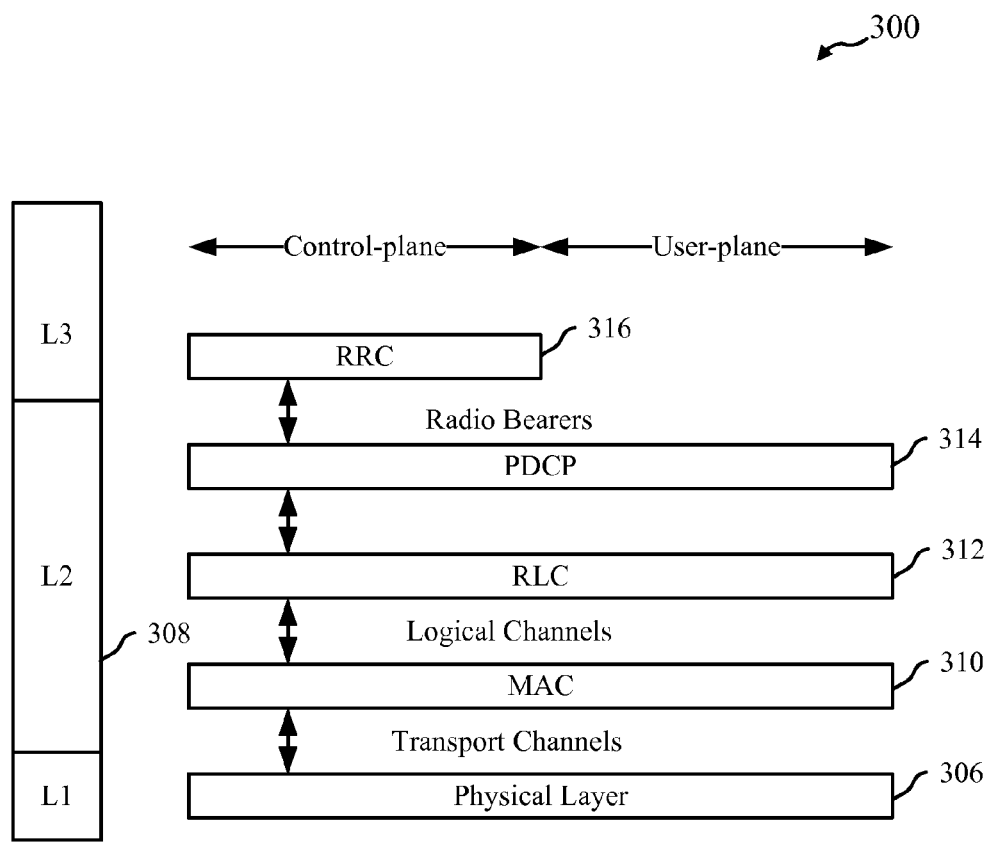
FIG. 3 illustrates an example of a radio protocol architecture for the user and control planes in LTE, in accordance with certain aspects of the present disclosure.

FIG. 3 illustrates an example of a radio protocol architecture 300 for the user and control planes in LTE. The radio protocol architecture 300 for the UE and the eNB is shown with three layers: Layer 1 (L1 layer), Layer 2 (L2 layer), and Layer 3 (L3 layer). The L1 layer is the lowest layer and implements various physical layer signal processing functions. The L1 layer will be referred to herein as the physical layer 306. The L2 layer 308 is above the physical layer 306 and is responsible for the link between the UE and eNB over the physical layer 306.

In the user plane, the L2 layer 308 includes a media access control (MAC) sublayer 310, a radio link control (RLC) sublayer 312, and a packet data convergence protocol (PDCP) 314 sublayer, which are terminated at the eNB on the network side. Although not shown, the UE may have several upper layers above the L2 layer 308 including a network layer (e.g., IP layer) that may be terminated at the PDN gateway (e.g. PDN 218 in FIG. 2) on the network side, and an application layer that is terminated at the other end of the connection (e.g., far end UE, server, etc.).

The PDCP sublayer 314 provides multiplexing between different radio bearers and logical channels. The PDCP sublayer 314 also provides header compression for upper layer data packets to reduce radio transmission overhead, security by ciphering the data packets, and handover support for UEs between eNBs. The RLC sublayer 312 provides segmentation and reassembly of upper layer data packets, retransmission of lost data packets, and reordering of data packets to compensate for out-of-order reception due to hybrid automatic repeat request (HARQ). The RLC sublayer 312 passes data to the MAC sub layer 310 as logical channels.

Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the UEs that receive MBMS. Dedicated control channel (DCCH) is another logical control channel that is a point-to-point bi-directional channel transmitting dedicated control information, such as user-specific control information used by the UE having an RRC connection. Common control channel (CCCH) is also a logical control channel that may be used for random access information. Logical traffic channels may comprise a dedicated traffic channel (DTCH), which is a point-to-point bi-directional channel dedicated to one UE for the transfer of user information. Also, a multicast traffic channel (MTCH) may be used for point-to-multipoint downlink transmission of traffic data.

As mentioned above, a UE may be capable of providing multiple different services to a user such as, for example, voice communications, text messages, email access, network access to remote networks such as the Internet, and file transfers to/from remote computers, to name a few. Each such service may have an associated Quality of Service (QoS) target that the UE seeks to maintain in order to have a favorable user experience. According to some examples, a UE may have a logical channel for separate services that the UE is providing to a user. The MAC sublayer 310 provides multiplexing between logical and transport channels. The MAC sublayer 310 is also responsible for allocating the various radio resources (e.g., resource blocks) in one cell among the UEs. The MAC sublayer 310 is also responsible for HARQ operations. The MAC layer formats and sends the logical channel data to the physical layer 306 as transport channels.

The DL transport channels may include a broadcast channel (BCH), a downlink shared data channel (DL-SCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels. According to certain aspects, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

In the control plane, the radio protocol architecture 300 for the UE and eNB is substantially the same for the physical layer 306 and the L2 layer 308 with the exception that there is no header compression function for the control plane. The control plane also includes a radio resource control (RRC) sublayer 316 in Layer 3 (L3 layer). The RRC sublayer 316 is responsible for obtaining radio resources (i.e., radio bearers) and for configuring the lower layers using RRC signaling between the eNB and the UE.

As mentioned above, a UE may be capable of providing multiple different services to a user, and the UE may have a different logical channel for one or more of such services. Furthermore, different services may have an associated QoS target that the UE seeks to maintain in order to have a favorable user experience. Logical channels may be prioritized within the MAC layer of UE, for example, based on QoS requirements for the service provided by the logical channel. For example, a real-time voice communication service may have a high QoS requirement, and a logical channel for this service may have a high priority relative to logical channels that may support, for example, a FTP file transfer to/from the UE. In some examples, logical channels may be given a priority from 1 to 16, with a channel priority of 1 being the highest priority, and a channel priority of 16 being the lowest priority. In some cases, during operation, if one or more of the logical channels has data to be transmitted to an eNB, the UE may forward a Scheduling Request (SR) to the eNB. The eNB, responsive to the SR, may grant the UE an uplink (UL) allocation for a defined Transmission Time Interval (TTI). The UL allocation to the UE is then divided up by the UE based on channel prioritization of the active logical channels. Data from the logical channels is used to build Service Data Units (SDUs). A SDU is a unit of data formed at the MAC layer, one or more of which may be used to form PDUs.

According to certain aspects, logical channel prioritization may be applied when a new transmission is performed. RRC controls the scheduling of uplink data by signaling, for each logical channel, a channel priority, a prioritized data rate or Prioritized Bit Rate (PBR) for the channel. The prioritized bit rate, in some examples, may be set to 8, 16, 32, 64, or 128 kbps. For each logical channel j, the UE may maintain a token bucket that includes an indication of whether there is a QoS obligation for the UE to allocate UL resources to the particular logical channel. The UE, in such cases, may maintain a variable "Bj" for each logical channel j to indicate the status of the token bucket. Bj may be initialized to zero when the related logical channel is established, and incremented by the product PBR×TTI duration for each TTI, where PBR is Prioritized Bit Rate of logical channel j. In operation, the UE may perform a logical channel prioritization procedure when a new transmission is performed. In the procedure, the UE may allocate resources to the logical channels in the following steps:

Step 1: All the logical channels with Bj>0 are allocated resources in a decreasing priority order.

Step 2: The UE decrements Bj by the total size of MAC SDUs served to logical channel j in Step 1. Note that the value of Bj can be negative.

Step 3: If any resources remain, all the logical channels are served in a decreasing priority order (regardless of the value of Bj) until either the data for that logical channel or the UL grant is exhausted, whichever comes first. Logical channels configured with equal priority should be served equally.

According to certain aspects, as a result of the logical channel prioritization procedure, a UE having multiple active logical channels with different priorities may have PBRs that are relatively small. Furthermore, in situations where an UL grant is relatively large, the token bucket level (Bj) may go negative for each channel, and may take some time to get back to non-negative. An example of Bj values is illustrated in the table of FIG. 4 for such a situation. In this example, a UE has three logical channels, channels 1 through 3, each having a different priority and a different PBR. In this example, the TTI may be 1 ms. According to the logical channel prioritization procedure described above, each of the logical channels 1-3 may have a value of Bj that is at or below zero by TTI 3. In the example of logical channel 1, the value of Bj is negative starting at TTI 2. In this example, if logical channel 1 has control data to be transmitted back to an eNB, such as a HARQ ACK/NACK response, this channel would not be allocated any UL resources until its value of Bj was greater than zero. Such a situation may result in delays in such control data being transmitted by the UE, and in some cases, may result in adverse results, such as an eNB assuming that the UE had some type of failure and initiating a RRC re-establishment procedure. Accordingly, according to certain aspects of the present disclosure, a UE may also identify whether a logical channel has any control data to be sent even when the Bj value for the channel does not meet a threshold (e.g., is not greater than zero). In an aspect, if a logical channel has control data to be transmitted and Bj does not meet the threshold, a UE may allocate UL resources to the logical channel according to the prioritization of the logical channel to transmit the control data. Examples of UL allocation of control data and/or data related to a QoS obligation are described in more detail below.

Figure 5:
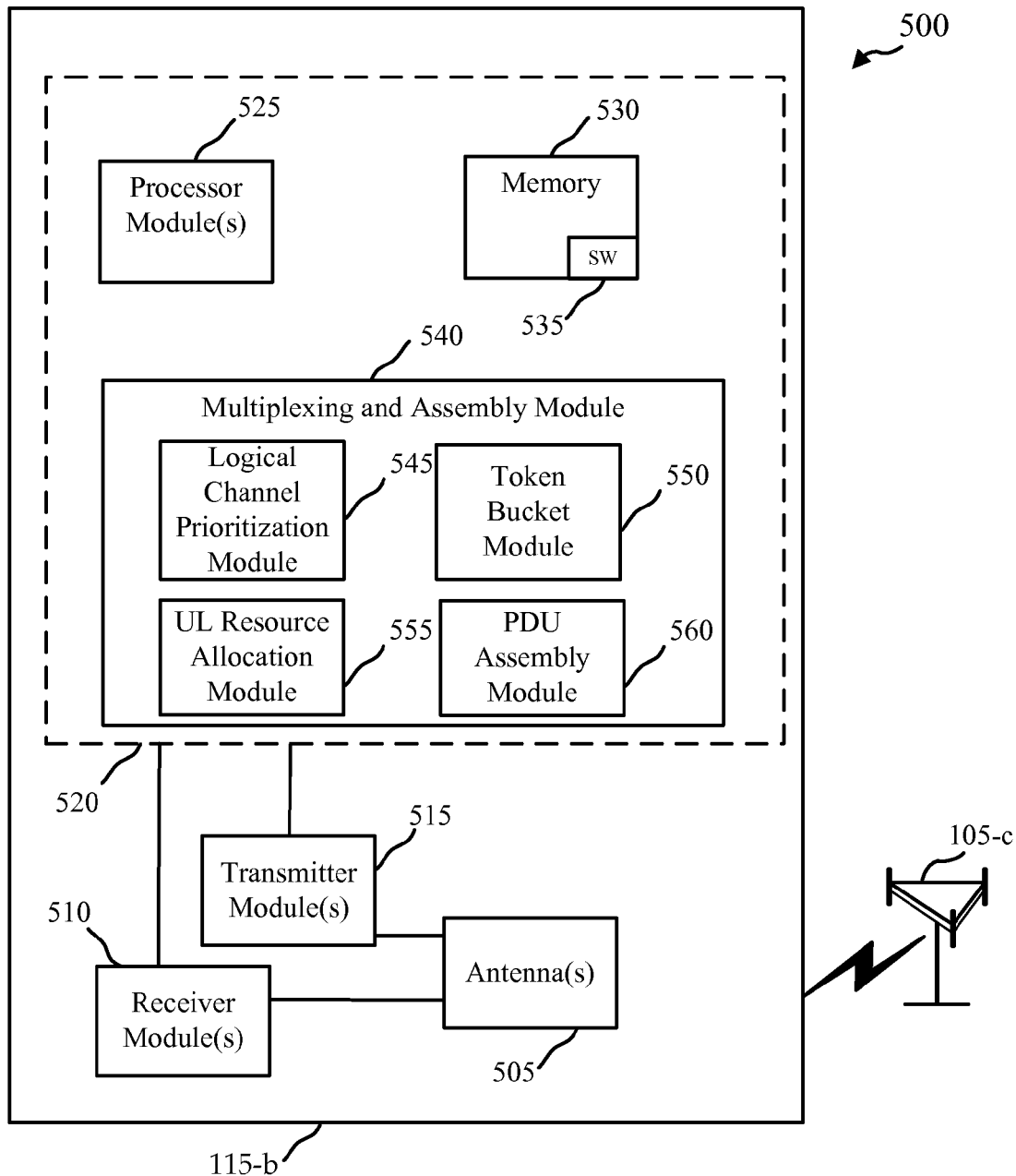
FIG. 5 illustrates a block diagram of an example of a user equipment (UE), in accordance with certain aspects of the present disclosure.

FIG. 5 illustrates an example wireless communication system 500 that performs logical channel prioritization based on QoS obligations and/or control data for a logical channel, according to certain aspects of the present disclosure. System 500 includes a UE 115-b that may communicate with BS 105-c to receive access to one or more wireless networks, similarly as described above. UE 115-b may be an example of a device 115 of FIGS. 1-2. UE 115-b, similarly as described above, may include one or more antenna(s) 505 communicatively coupled to receiver module(s) 510 and transmitter module(s) 515, which may in turn be communicatively coupled to a control module 520. Control module 520 may include one or more processor module(s) 525, a memory 530 that may include software 535, and a multiplexing and assembly module 540. The software 535 may be for execution by processor module 525 and/or multiplexing and assembly module 540.

The processor module(s) 525 may include an intelligent hardware device, e.g., a central processing unit (CPU), a microcontroller, an application specific integrated circuit (ASIC), etc. The memory 530 may include random access memory (RAM) and read-only memory (ROM). The memory 530 may store computer-readable, computer-executable software code 535 containing instructions that are configured to, when executed (or when compiled and executed), cause the processor module 525 and/or multiplexing and assembly module 540 to perform various functions described herein (e.g., timing adjustment storage, maintaining timers associated with timing adjustment information, validity determination for timing information, timing information updates, etc.). The multiplexing and assembly module 540 may be implemented as a part of the processor module(s) 525, or may be implemented using one or more separate CPUs or ASICs, for example. The transmitter module(s) 515 may transmit to BS 105-c (and/or other BSs) to establish communications with one or more wireless communications networks (e.g., E-UTRAN, UTRAN, etc.), as described above. The receiver module(s) 510 may receive downlink transmissions from BS 105-c (and/or other BSs), as described above. Downlink transmissions are received and processed at the UE 115-b.

The multiplexing and assembly module 540 may include a logical channel prioritization module 545, a token bucket module 550, a UL resource allocation module 555, and a PDU assembly module 560. As described above, UE 115-b may have multiple logical channels that may share UL allocations provided to the UE 115-b from BS 105-c. According to certain aspects, the UL resource allocation module 555 may receive an allocation of uplink resources from the BS 105-c for a time period (e.g., a TTI), and the logical channel prioritization module 545 may identify whether the UE 115-b has a QoS obligation to allocate at least a portion of the uplink resources to a first logical channel for the time period. The token bucket module 550 may operate to identify, for the time period, whether the first logical channel has QoS-related data and/or control data to be transmitted. If the token bucket module 550 identifies one or more of QoS-related data or control data, the UL resource allocation module 555 may allocate at least a portion of the uplink resources to the first logical channel. PDU assembly module 560 may then assemble the data to be transmitted into appropriate PDUs for transmission.

According to certain aspects, in situations where multiple logical channels are present, the logical channel prioritization module 545 may identify the channels and the token bucket module 550 may identify whether the UE 115-b has a second (or third, or fourth, etc.) QoS obligation to allocate at least a portion of the uplink resources to additional logical channel(s) for the time period, the additional channel(s) having a lower priority than the first logical channel. The token bucket module 550 may further identify whether any of the other logical channel(s) have any control data that is to be transmitted from the UE. The UL resource allocation module 555 may then allocate UL resources to the additional logical channel(s). As mentioned above, in cases where the token bucket module indicates that the first logical channel does not have a QoS obligation to allocate uplink resources to the first logical channel, but the first logical channel has control data, the UL resource allocation module 555 may allocate resources to the first logical channel as a first priority ahead of the allocation of resources to the other logical channel(s). PDU assembly module 560 may then assemble the data to be transmitted into appropriate PDUs for transmission. In cases where both control and data are to be transmitted, the PDU assembly module 560 builds both data PDUs and control PDUs for the logical channel. In cases where only logical channel data is to be transmitted, the PDU assembly module 560 builds data PDUs for the logical channel, and in cases where only control data is to be transmitted, the PDU assembly module 560 builds control PDUs for the logical channel.

Figure 6:
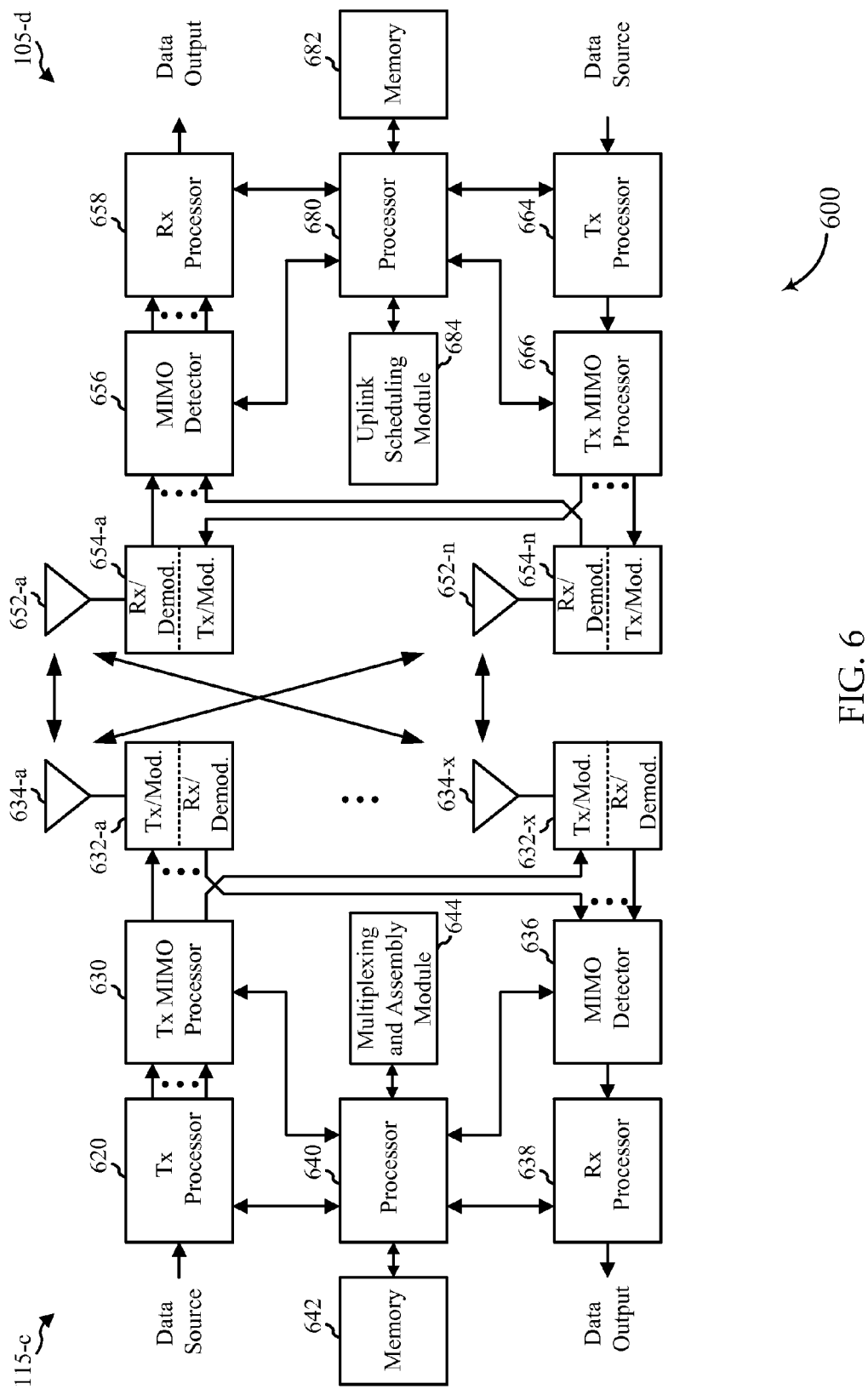
FIG. 6 illustrates a block diagram of a user equipment (UE) and a base station (BS) in a wireless communications system, in accordance with certain aspects of the present disclosure.

FIG. 6 illustrates a block diagram of a system 600 including a BS 105-d and a UE 115-c, according to certain aspects of the present disclosure. System 600 may be an example of the system 100 of FIG. 1, UE 115-a and E-UTRAN 204 of FIG. 2, and/or system 500 of FIG. 5. The BS 105-d may be equipped with antennas 652-a through 652-n, and the UE 115-c may be equipped with antennas 634-a through 634-x. UE 115-c and BS 105-d may communicate according to network protocols of one or more wireless communications networks, such as, for example, E-UTRAN, UTRAN, and GERAN, similarly as discussed above. At the UE 115-c, a transmit (TX) processor 620 may receive data from a data source, a processor 640, and/or multiplexing and assembly module 644. Multiplexing and assembly module 644 may perform, or assist in the performance, of uplink communications from logical channels of the UE. In one aspect, UE 115-c may receive uplink allocations from the BS 105-d and transmit data from one or more logical channels using the UL allocation, with data from the logical channels assembled and multiplexed according to channel prioritization established for the logical channels.

The TX processor 620 may process (e.g., encode and symbol map) the data and control information to obtain data symbols and control symbols, respectively, with timing adjustments for uplink transmissions. The TX processor 620 may also generate reference symbols and cell-specific reference signals. A TX multiple-input multiple-output (MIMO) processor 630 may perform spatial processing (e.g., precoding) on the data symbols, the control symbols, and/or the reference symbols, if applicable, and may provide output symbol streams to the TX modulators 632-a through 632-x. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a uplink signal. Uplink signals from modulators 632-a through 632-x may be transmitted via the antennas 634-a through 634-x, respectively.

At the BS 105-d, the antennas 652-a through 652-n may receive the uplink signals from the UE 115-c and may provide the received signals to the demodulators 654-a through 654-n, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654-a through 654-n, perform MIMO detection on the received symbols, if applicable, and provide detected symbols. A receive (RX) processor 658 may process (e.g., demodulate, deinterleave, and decode) the detected symbols, providing decoded data to a data output, and provide decoded control information to a processor 680, and/or memory 682. RX processor 658 also may perform error correction on the decoded data to correct bit errors that may be present in the decoded data.

On the uplink, at the BS 105-d, a TX processor 664 may receive and process data from a data source and from the processor 680 and/or memory 682. The uplink data may be transmitted from the UE 115-c according to an allocation provided by an uplink scheduling module 684 of the BS 105-d. The TX processor 664 may also generate reference symbols for a reference signal. The symbols from the TX processor 664 may be precoded by a TX MIMO processor 666, if applicable, further processed by the demodulators 654-a through 654-n (e.g., for SC-FDMA, etc.), and be transmitted to the UE 115-c. At the UE 115-c, the downlink signals from the BS 105-d may be received by the antennas 634, processed by the demodulators 632, detected by a MIMO detector 636, if applicable, and further processed by a RX processor 638 to obtain decoded data and control information sent by the BS 105-d. The RX processor 638 may provide the decoded data to a data output and decoded control information to the processor 640. A multiplexing and assembly module 644 may prioritize logical channels and build PDUs for uplink transmission, as described above. The components of the UE 115-c may, individually or collectively, be implemented with one or more Application Specific Integrated Circuits (ASICs) adapted to perform some or all of the applicable functions in hardware. Each of the noted modules may be a means for performing one or more functions related to operation of the system 600. Similarly, the components of the BS 105-d may, individually or collectively, be implemented with one or more Application Specific Integrated Circuits (ASICs) adapted to perform some or all of the applicable functions in hardware. Each of the noted modules may be a means for performing one or more functions related to operation of the system 600 and/or other functions provided herein. In aspects, one or more of the modules of FIG. 5 may be included in one or more of the processors 640, 638, 620, 630, 644 of FIG. 6.

According to aspects, the controllers/processors 640 and 680 may direct the operation at the UE 115-c and BS 105-d, respectively. According to an aspect, the controller/processor 640, TX Processor 620, RX Processor 638, TX MIMO Processor 630 and/or other processors and modules at UE 115-c may perform or direct operations 700 in FIG. 7, operations 800 in FIG. 8, operations 900 in FIG. 9, operations 1000 in FIG. 10, operations 1100 in FIG. 11 and/or other processes for the techniques described herein. According to an aspect, the memories 642 and 682 may store data and program codes for the UE 115-c and the BS 105-d, respectively.

Figure 7:
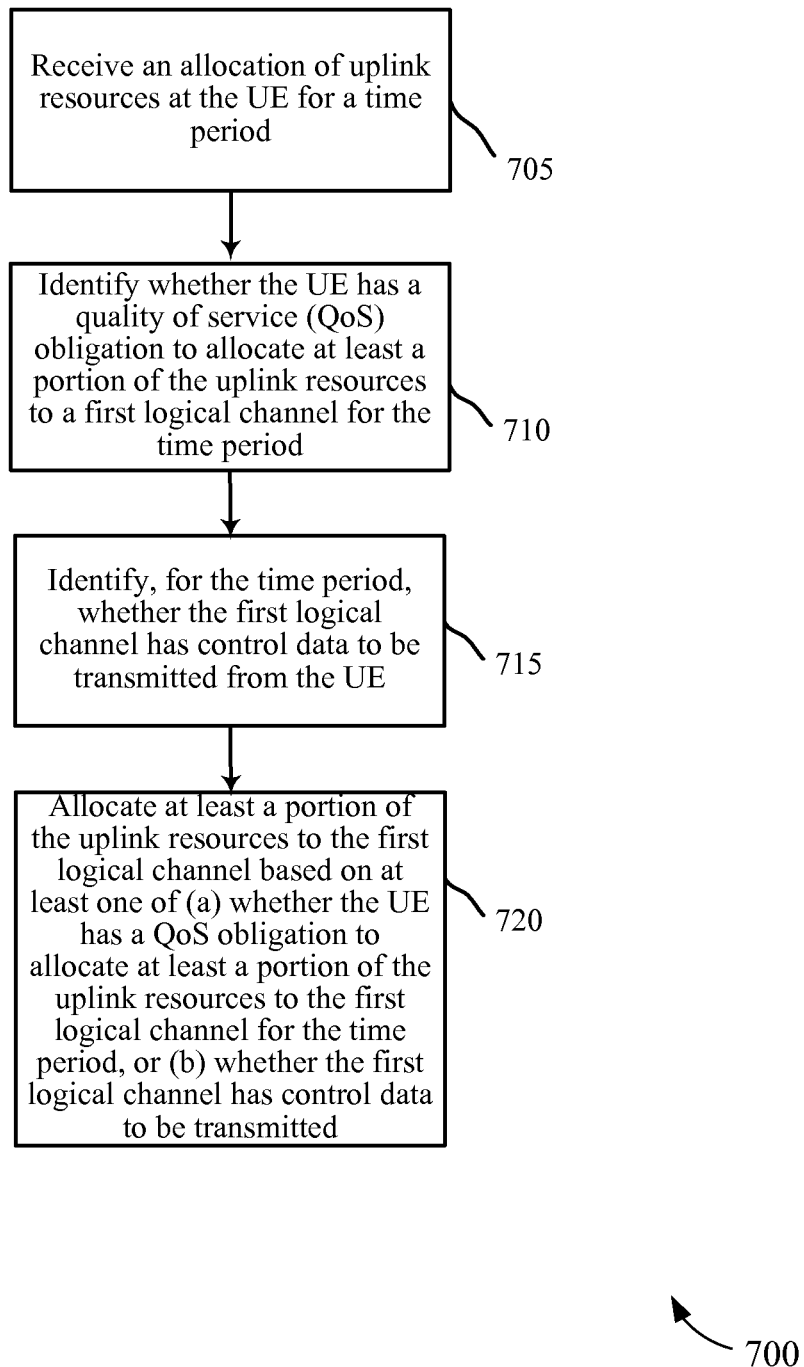
FIG. 7 illustrates example operations for logical channel prioritization based on a quality of service (QoS) obligation and/or control data that may be present for the logical channel, in accordance with certain aspects of the present disclosure.

FIG. 7 illustrates example operations 700 for logical channel prioritization, according to certain aspects of the present disclosure. The operations 700 may be performed by a UE, such as, for example, a UE of FIG. 1, 2, 5 or 6, or using any combination of the devices described for these figures.

The operations 700 begin, at 705, by receiving an allocation of uplink resources at the UE for a time period. In an aspect, the time period may correspond to a transmission time interval (TTI), as defined in an uplink resource allocation received from an enhanced Node B (eNB) or BS of a wireless communications network. At 710, the UE identifies whether the UE has a QoS obligation to allocate at least a portion of the uplink resources to a first logical channel for the time period. According to an aspect, identifying whether the UE has a QoS obligation to allocate the uplink resources to the first logical channel may be based on a status of a variable established for the first logical channel that identifies that the QoS obligation related to the first logical channel has been met. For example, in one implementation, a UE may have a variable (e.g., Bj as described in FIG. 4) that indicates the presence of data for a logical channel is to be transmitted according to a QoS commitment. In an aspect, the variable may be based on a prioritized bit rate (PBR) of the first logical channel and a TTI associated with the time period. According to another aspect, identifying whether the UE has a QoS obligation to allocate at least a portion of the uplink resources to a first logical channel for the time period may be based on whether a PBR value of the first logical channel corresponds to a signaling radio bearer SRB1 or signaling radio bearer SRB2, carrying RRC signaling messages.

At 715, the UE identifies, for the time period, whether the first logical channel has control data to be transmitted from the UE. According to certain aspects, such control data may be, for example, Radio Link Control (RLC) data corresponding to data received from the BS. In an aspect, the RLC data may include acknowledgment or negative acknowledgment (ACK/NACK) data corresponding to data received from the BS or at least one RLC protocol data unit (PDU).

At 720, the UE allocates at least a portion of the uplink resources to the first logical channel based on at least one of: whether the UE has a QoS obligation to allocate at least a portion of the uplink resources to the first logical channel for the time period, or whether the first logical channel has control data to be transmitted from the UE. In an aspect, allocating at least a portion of the uplink resources to the first logical channel includes allocating enough uplink resources to the first logical channel to transmit the control data.

Figure 8:
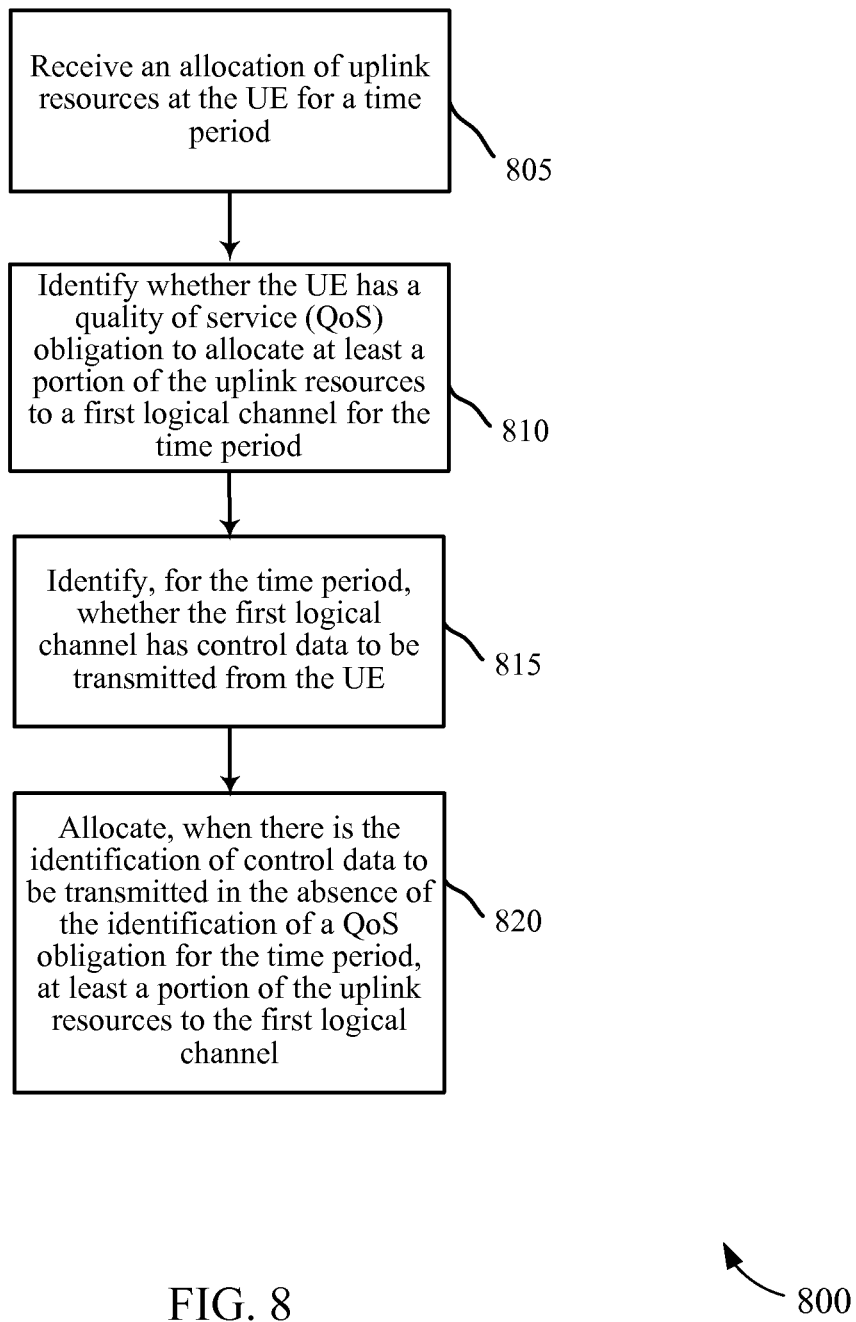
FIG. 8 illustrates example operations for logical channel prioritization based on a QoS obligation and/or control data that may be present for the logical channel, in accordance with certain aspects of the present disclosure.

As mentioned previously, a UE may allocate uplink resources to a logical channel even though the token bucket associated with the logical channel may not meet a threshold (e.g., is not greater than zero) when the logical channel has control data to be transmitted. Accordingly, according to certain aspects, additionally or alternatively to other aspects provided herein, as described in more detail below with reference to FIG. 8, allocating at least a portion of the uplink resources to the first logical channel may include allocating, when there is the identification of control data to be transmitted in the absence of the identification of the QoS obligation for the time period, at least a portion of the uplink resources to the first logical channel. FIG. 8 illustrates example operations 800 for logical channel prioritization, according to certain aspects of the present disclosure. The operations 800 may be performed by a UE, such as, for example, a UE of FIG. 1, 2, 5 or 6, or using any combination of the devices described for these figures.

The operations 800 begin, at 805, by receiving an allocation of uplink resources at the UE for a time period. At 810, the UE identifies whether the UE has a QoS obligation to allocate at least a portion of the uplink resources to a first logical channel for the time period. At 815, the UE identifies, for the time period, whether the first logical channel has control data to be transmitted from the UE. At 820, the UE allocates, when there is the identification of control data to be transmitted in the absence of the identification of a QoS obligation for the time period, at least a portion of the uplink resources to the first logical channel. Accordingly, in such a manner, even though Bj may be negative for the logical channel (e.g., as described above with regard to FIG. 4), control data may continue to be sent according to the logical channel's priority.

Figure 9:
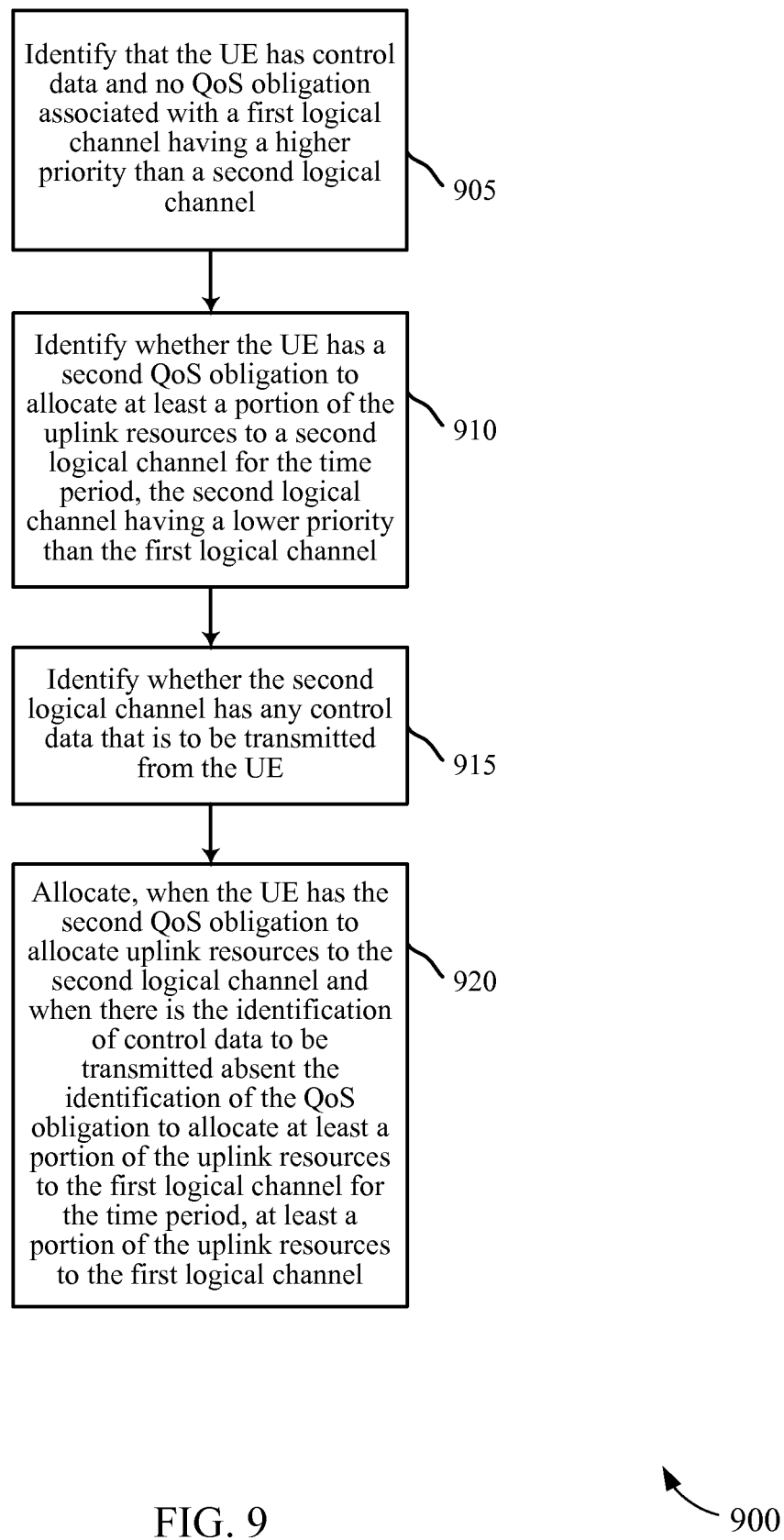
FIG. 9 illustrates example operations for logical channel prioritization based on a QoS obligation and/or control data that may be present for the logical channel, in accordance with certain aspects of the present disclosure.

FIG. 9 illustrates other example operations 900 for logical channel prioritization, according to certain aspects of the present disclosure. The operations 900 may be performed by a UE, such as, for example, a UE of FIG. 1, 2, 5 or 6, or using any combination of the devices described for these figures.

The operations 900 begin, at 905, by identifying that the UE has control data and no QoS obligation (e.g., Bj is not greater than 0 for the logical channel) associated with a first logical channel having a higher priority than a second logical channel. At 910, the UE identifies whether the UE has a second QoS obligation to allocate at least a portion of the uplink resources to a second logical channel for the time period, the second logical channel having a lower priority than the first logical channel. At 915, the UE identifies whether the second logical channel has any control data that is to be transmitted from the UE. At 920, the UE allocates, when the UE has the second QoS obligation to allocate uplink resources to the second logical channel and when there is the identification of control data to be transmitted in the absence of the identification of the QoS obligation to allocate at least a portion of the uplink resources to the first logical channel for the time period, at least a portion of the uplink resources to the first logical channel. According to an aspect, allocating at least a portion of the uplink resources to the first logical channel may be performed ahead of any allocation of uplink resources to the second logical channel for the time period. According to another aspect, the first logical channel may have a prioritized data rate that is greater than a prioritized data rate of the second logical channel.

Figure 10:
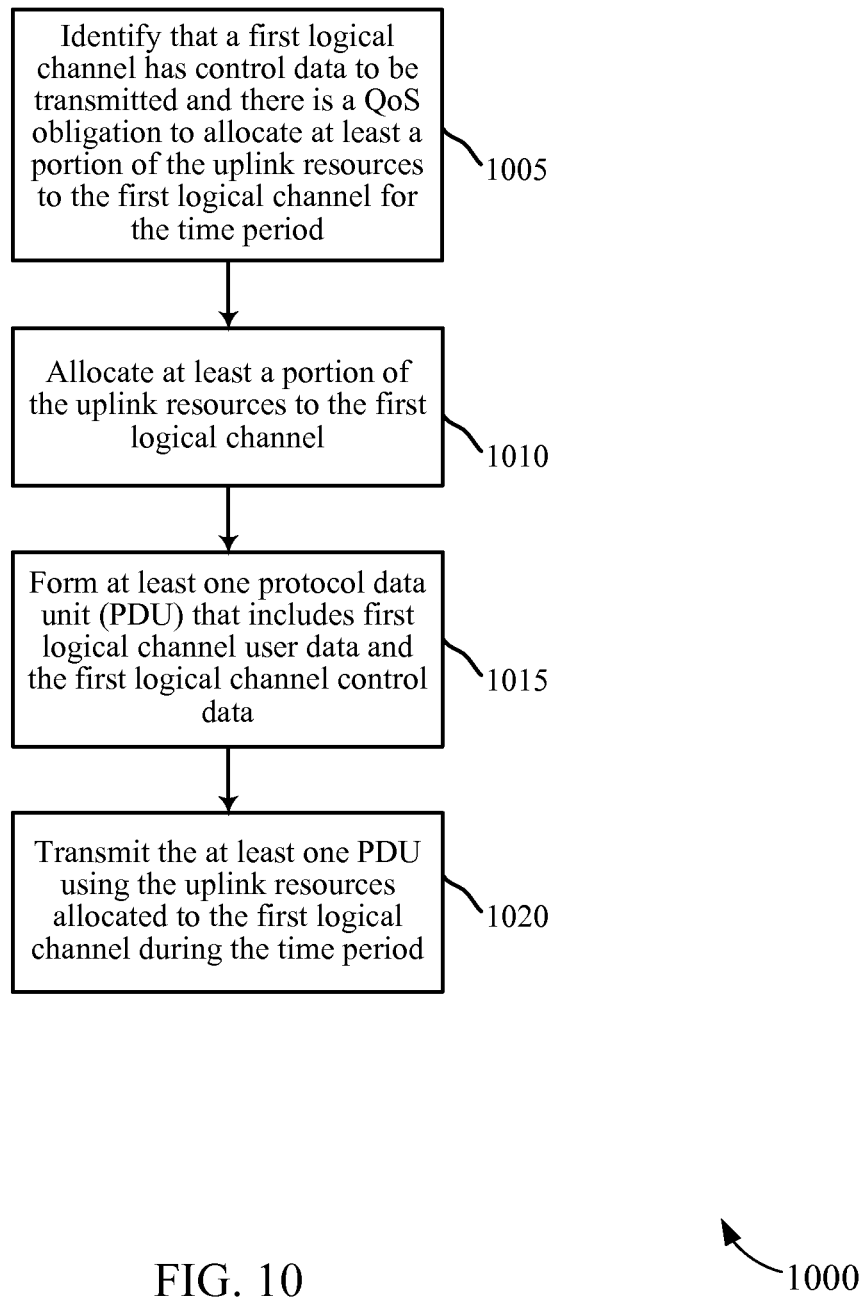
FIG. 10 illustrates example operations for logical channel prioritization and transmitting data associated with a logical channel, in accordance with certain aspects of the present disclosure.

FIG. 10 illustrates example operations 1000 for logical channel prioritization and transmitting data associated with a logical channel, according to certain aspects of the present disclosure. The operations 1000 may be performed by a UE, such as, for example, a UE of FIG. 1, 2, 5 or 6, or using any combination of the devices described for these figures.

The operations 1000 begin, at 1005, by identifying that a first logical channel has control data to be transmitted and there is a QoS obligation to allocate at least a portion of the uplink resources to the first logical channel for the time period. According to an aspect, the operations 1000 may also include the UE identifying that the first logical channel has control data to be transmitted absent a QoS obligation to allocate uplink resources to the first logical channel for the time period. At 1010, the UE allocates at least a portion of the uplink resources to the first logical channel. At 1015, the UE forms at least one protocol data unit (PDU) that includes first logical channel user data and the first logical channel control data. At 1020, the UE transmits the at least one PDU using the uplink resources allocated to the first logical channel during the time period. According to certain aspects, in examples where only user data or only control data are present, the UE may then form at least one PDU containing the user data or control data, which is then transmitted using the uplink resources allocated to the first logical channel during the time period.

Figure 11:
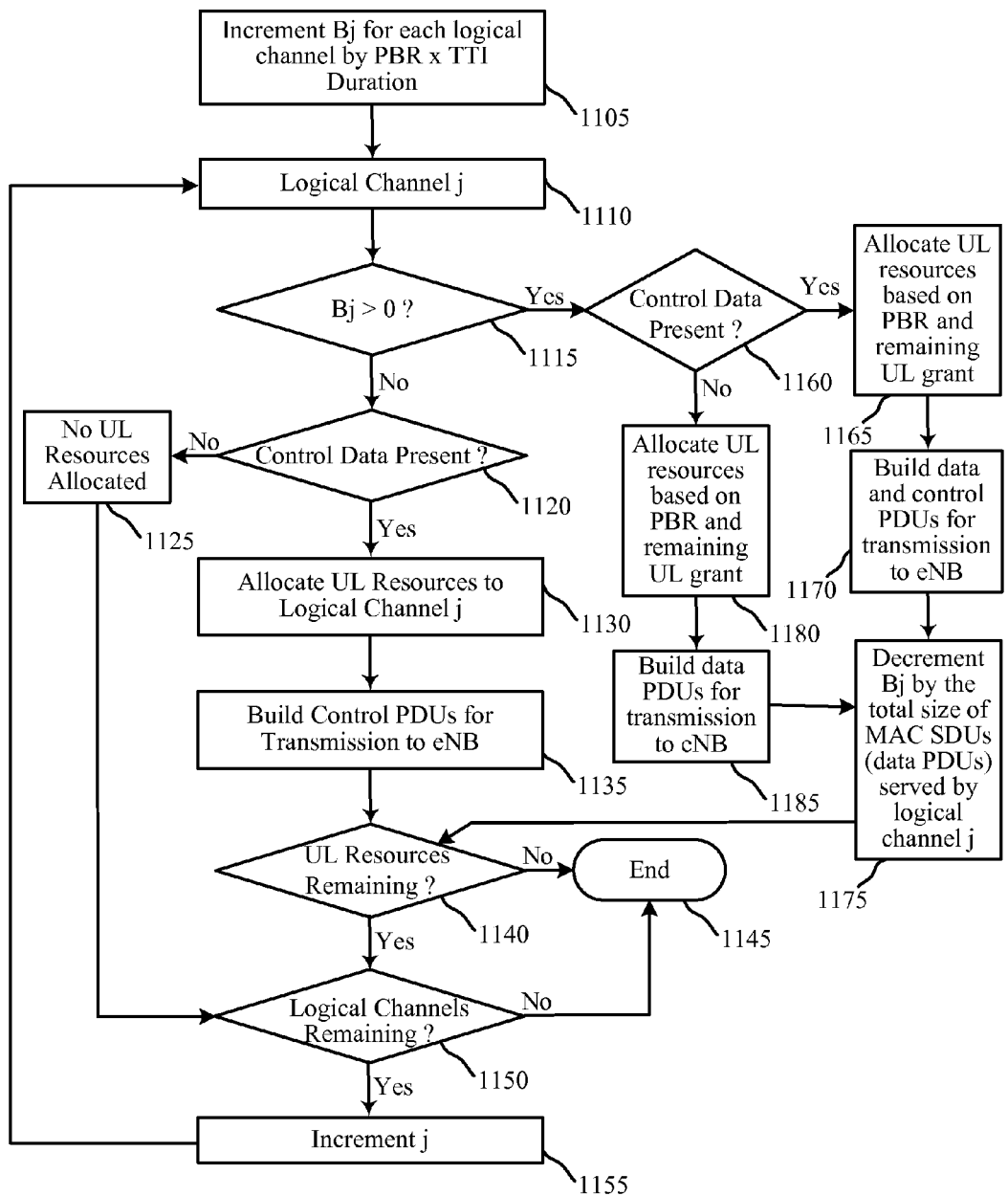
FIG. 11 illustrates example operations for logical channel prioritization and transmitting data associated with a logical channel, in accordance with certain aspects of the present disclosure.

FIG. 11 illustrates example operations 1100 for logical channel prioritization and transmitting data associated with a logical channel, according to certain aspects of the present disclosure. The operations 1100 may be performed by a UE, such as, for example, a UE of FIG. 1, 2, 5 or 6, or using any combination of the devices described for these figures.

The operations 1100 begin, at 1105, by incrementing Bj for each logical channel by the PBR and TTI duration associated with an uplink allocation received from an eNB. At 1110, the UE selects a first logical channel (e.g., logical channel j) having the highest priority. According to certain aspects, logical channels may be prioritized according to predetermined criteria for the services provided by the logical channel, including a QoS target for the logical channel. At 1115, the UE determines if the token bucket value, Bj, for the logical channel j is greater than zero, indicating whether a QoS obligation for the logical channel is met. If Bj is not greater than zero at 1115, at 1120, the UE determines if control data for logical channel j is present. If no control data is present at 1120, at 1125, no uplink resources are allocated to the logical channel by the UE. If control data is present at 1120, at 1130, the UE allocates uplink resources to logical channel j. According to an aspect, the uplink resources may be allocated according to the PBR of the logical channel and the uplink allocation for the particular TTI. At 1135, the UE builds control PDUs for transmission to the eNB. The formed PDUs are then passed to the physical layer for transmission to the eNB. According to an aspect, an identification that Bj is not greater than zero may indicate that the logical channel does not need to transmit user data to meet its QoS obligation, and thus there may be no requirement for user data PDUs to be formed.

At 1140, the UE determines if any uplink resources remain for allocation by the UE. If no uplink resources remain, at 1145, the process ends. If uplink resources remain, at 1150, the UE determines if any logical channels remain that may have data to be transmitted. If no channels remain, at 1145, the process ends. If any logical channels remain, at 1155, the UE increments j, and the operations continue at 1110.

If, at 1115, the UE determines that Bj is greater than zero, indicating that the logical channel should transmit associated data to meet its QoS obligation, at 1160, the UE determines if control data is present. If control data is present at 1160, at 1165, the UE allocates uplink resources to the logical channel based on the channel PBR and the remaining UL grant. At 1170, the UE builds data and control PDUs for transmission to the eNB by the physical layer. At 1175, the UE decrements Bj by the total size of the MAC SDUs (e.g., data PDUs) served by logical channel j. The operations 1100 then continue to 1140. If the UE determines that control data is not present at 1160, at 1180, the UE allocates uplink resources for the logical channel based on the PBR of the logical channel and the remaining uplink grant. At 1185, the UE builds data PDUs for transmission to the eNB by the physical layer. The operations 1100 then continue to 1175.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The various operations of methods described above may be performed by any suitable means capable of performing the corresponding functions. The means may include various hardware and/or software component(s) and/or module(s), including, but not limited to a circuit, an application specific integrated circuit (ASIC), or processor. Such means may be included in and/or be one or more components illustrated in the Figures. Generally, where there are operations illustrated in Figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The steps of a method or algorithm described in connection with the present disclosure may be embodied directly in hardware, in a software module executed by a processor, or in a combination of the two. A software module may reside in any form of storage medium that is known in the art. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for logical channel prioritization by a user equipment (UE) within a Long Term Evolution (LTE) wireless communications network, comprising:
   receiving an allocation of uplink resources at the UE for a time period;
   identifying whether the UE has a quality of service (QoS) obligation to allocate at least a portion of the uplink resources to a first logical channel for the time period;
   identifying, for the time period, whether the first logical channel has control data to be transmitted from the UE; and
   allocating at least a portion of the uplink resources to the first logical channel based on at least one of:
      whether the UE has a QoS obligation to allocate at least a portion of the uplink resources to the first logical channel for the time period, or
      whether the first logical channel has control data to be transmitted from the UE.

2. The method of claim 1, wherein allocating at least a portion of the uplink resources to the first logical channel includes allocating, when there is the identification of control data to be transmitted in absence of the identification of a QoS obligation for the time period, at least a portion of the uplink resources to the first logical channel.

3. The method of claim 2, further comprising:
   identifying whether the UE has a second QoS obligation to allocate at least a portion of the uplink resources to a second logical channel for the time period, the second logical channel having a lower priority than the first logical channel;
   identifying whether the second logical channel has any control data that is to be transmitted from the UE; and
   allocating, when the UE has the second QoS obligation to allocate uplink resources to the second logical channel and when there is the identification of control data to be transmitted in the absence of the identification of a QoS obligation to allocate at least a portion of the uplink resources to the first logical channel for the time period, at least a portion of the uplink resources to the first logical channel.

4. The method of claim 3, wherein allocating at least a portion of the uplink resources to the first logical channel is performed ahead of any allocation of uplink resources to the second logical channel for the time period.

5. The method of claim 3, wherein the first logical channel has a prioritized data rate that is greater than a prioritized data rate of the second logical channel.

6. The method of claim 2, further comprising:
   identifying that the first logical channel has control data to be transmitted absent a QoS obligation to allocate uplink resources to the first logical channel for the time period;
   allocating at least a portion of the uplink resources to the first logical channel;
   forming at least one protocol data unit (PDU) that includes the first logical channel control data; and
   transmitting the at least one PDU using the uplink resources allocated to the first logical channel during the time period.

7. The method of claim 1, wherein identifying whether the UE has a QoS obligation to allocate the uplink resources to the first logical channel is based on a status of a variable established for the first logical channel that identifies that the QoS obligation related to the first logical channel has been met.

8. The method of claim 7, wherein the variable is based on a prioritized bit rate (PBR) of the first logical channel and a transmission time interval (TTI) associated with the time period.

9. The method of claim 1, further comprising:
   identifying that the first logical channel has control data to be transmitted and there is the QoS obligation to allocate at least a portion of the uplink resources to the first logical channel for the time period;
   allocating at least a portion of the uplink resources to the first logical channel;
   forming at least one protocol data unit (PDU) that includes first logical channel user data and the first logical channel control data; and
   transmitting the at least one PDU using the uplink resources allocated to the first logical channel during the time period.

10. The method of claim 1, wherein the control data comprises Radio Link Control (RLC) data corresponding to data received from an enhanced NodeB (eNB).

11. The method of claim 1, wherein identifying whether the UE has a QoS obligation to allocate at least a portion of the uplink resources to the first logical channel for the time period is based on whether a prioritized bit rate (PBR) value of the first logical channel corresponds to signaling radio bearer SRB1 or signaling radio bearer SRB2.

12. The method of claim 1, wherein allocating at least a portion of the uplink resources to the first logical channel includes allocating enough uplink resources to the first logical channel to transmit the control data.

13. An apparatus for wireless communications by a user equipment (UE) within a Long Term Evolution (LTE) wireless communications network, comprising:
   at least one processor configured to:
      receive an allocation of uplink resources at the UE for a time period;

identify whether the UE has a quality of service (QoS) obligation to allocate at least a portion of the uplink resources to a first logical channel for the time period;

identify, for the time period, whether the first logical channel has control data to be transmitted from the UE; and allocate at least a portion of the uplink resources to the first logical channel based on at least one of:
- whether the UE has a QoS obligation to allocate at least a portion of the uplink resources to the first logical channel for the time period, or
- whether the first logical channel has control data to be transmitted from the UE; and a memory coupled with the at least one processor.

14. The apparatus of claim 13, wherein the at least one processor is further configured to allocate, when there is the identification of control data to be transmitted absent the identification of a QoS obligation for the time period, at least a portion of the uplink resources to the first logical channel.

15. The apparatus of claim 14, wherein the at least one processor is further configured to:
identify whether the UE has a second QoS obligation to allocate at least a portion of the uplink resources to a second logical channel for the time period, the second logical channel having a lower priority than the first logical channel;
identify whether the second logical channel has any control data that is to be transmitted from the UE; and
allocate, when the UE has the second QoS obligation to allocate uplink resources to the second logical channel and when there is the identification of control data to be transmitted absent the identification of a QoS obligation to allocate at least a portion of the uplink resources to the first logical channel for the time period, at least a portion of the uplink resources to the first logical channel.

16. The apparatus of claim 15, wherein the at least one processor is further configured to allocate at least a portion of the uplink resources to the first logical channel ahead of any allocation of uplink resources to the second logical channel for the time period.

17. The apparatus of claim 15, wherein the first logical channel has a prioritized data rate that is greater than a prioritized data rate of the second logical channel.

18. The apparatus of claim 14, wherein the at least one processor is further configured to:
identify that the first logical channel has control data to be transmitted absent a QoS obligation to allocate uplink resources to the first logical channel for the time period;
allocate at least a portion of the uplink resources to the first logical channel;
form at least one protocol data unit (PDU) that includes the first logical channel control data; and
transmit the at least one PDU using the uplink resources allocated to the first logical channel during the time period.

19. The apparatus of claim 13, wherein the at least one processor is further configured to identify whether the UE has a QoS obligation to allocate the uplink resources to the first logical channel based on a status of a variable established for the first logical channel that identifies that the QoS obligation related to the first logical channel has been met.

20. The apparatus of claim 19, wherein the variable is based on a prioritized bit rate (PBR) of the first logical channel and a transmission time interval (TTI) associated with the time period.

21. The apparatus of claim 13, wherein the at least one processor is further configured to:
identify that the first logical channel has control data to be transmitted and there is the QoS obligation to allocate at least a portion of the uplink resources to the first logical channel for the time period;
allocate at least a portion of the uplink resources to the first logical channel;
form at least one protocol data unit (PDU) that includes first logical channel user data and the first logical channel control data; and
transmit the at least one PDU using the uplink resources allocated to the first logical channel during the time period.

22. The apparatus of claim 13, wherein the control data comprises Radio Link Control (RLC) data corresponding to data received from an enhanced NodeB (eNB).

23. An apparatus for logical channel prioritization by a user equipment (UE) within a Long Term Evolution (LTE) wireless communications network, comprising:
means for receiving an allocation of uplink resources at the UE for a time period;
means for identifying whether the UE has a quality of service (QoS) obligation to allocate at least a portion of the uplink resources to a first logical channel for the time period;
means for identifying, for the time period, whether the first logical channel has control data to be transmitted from the UE; and
means for allocating at least a portion of the uplink resources to the first logical channel based on at least one of:
- whether the UE has a QoS obligation to allocate at least a portion of the uplink resources to the first logical channel for the time period, or
- whether the first logical channel has control data to be transmitted from the UE.

24. The apparatus of claim 23, wherein the means for allocating at least a portion of the uplink resources to the first logical channel includes means for allocating, when there is the identification of control data to be transmitted absent the identification of a QoS obligation for the time period, at least a portion of the uplink resources to the first logical channel.

25. The apparatus of claim 24, further comprising:
means for identifying that the first logical channel has control data to be transmitted absent a QoS obligation to allocate uplink resources to the first logical channel for the time period;
means for allocating at least a portion of the uplink resources to the first logical channel;
means for forming at least one protocol data unit (PDU) that includes the first logical channel control data; and
means for transmitting the at least one PDU using the uplink resources allocated to the first logical channel during the time period.

26. The apparatus of claim 23, wherein the means for identifying whether the UE has a QoS obligation to allocate the uplink resources to the first logical channel identifies based on a status of a variable established for the first logical channel that identifies that the QoS obligation related to the first logical channel has been met.

27. The apparatus of claim 26, wherein the variable is based on a prioritized bit rate (PBR) of the first logical channel and a transmission time interval (TTI) associated with the time period.

28. The apparatus of claim 23, further comprising:
means for identifying that the first logical channel has control data to be transmitted and there is the QoS obligation to allocate at least a portion of the uplink resources to the first logical channel for the time period;

means for allocating at least a portion of the uplink resources to the first logical channel;

means for forming at least one protocol data unit (PDU) that includes first logical channel user data and the first logical channel control data; and means for transmitting the at least one PDU using the uplink resources allocated to the first logical channel during the time period.

29. A non-transitory computer-readable medium for wireless communications by a user equipment (UE) within a Long Term Evolution (LTE) wireless communications network, the computer-readable medium encoded with one or more instructions, the one or more instructions executable by one or more processors for:

receiving an allocation of uplink resources at the UE for a time period;

identifying whether the UE has a quality of service (QoS) obligation to allocate at least a portion of the uplink resources to a first logical channel for the time period;

identifying, for the time period, whether the first logical channel has control data to be transmitted from the UE; and allocating at least a portion of the uplink resources to the first logical channel based on at least one of:

whether the UE has a QoS obligation to allocate at least a portion of the uplink resources to the first logical channel for the time period, or whether the first logical channel has control data to be transmitted from the UE.

30. The non-transitory computer-readable medium of claim 29, wherein the one or more instructions for allocating at least a portion of the uplink resources to the first logical channel includes one or more instructions for allocating, when there is the identification of control data to be transmitted absent the identification of a QoS obligation for the time period, at least a portion of the uplink resources to the first logical channel.

\* \* \* \* \*